R. A. FESSENDEN.
WIRELESS TELEGRAPHY.
APPLICATION FILED FEB. 2, 1910.

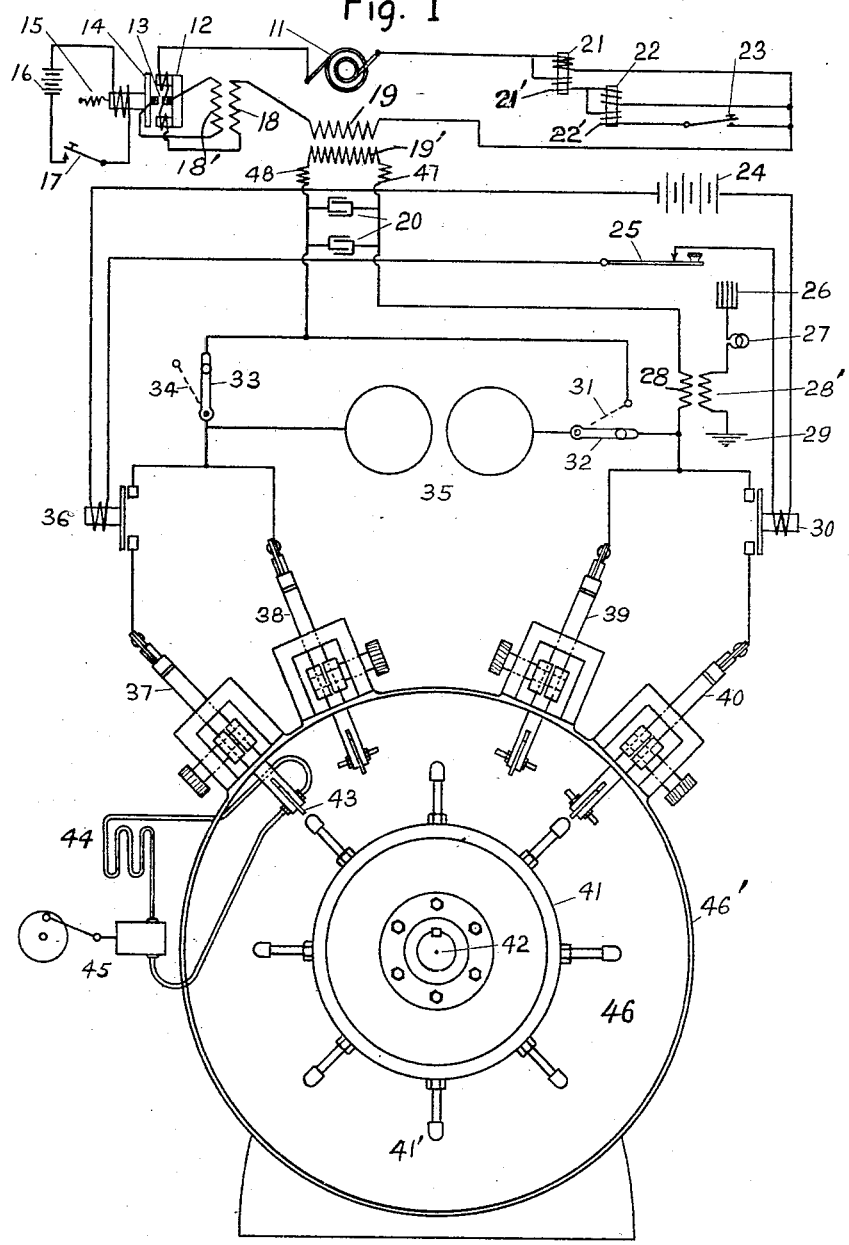

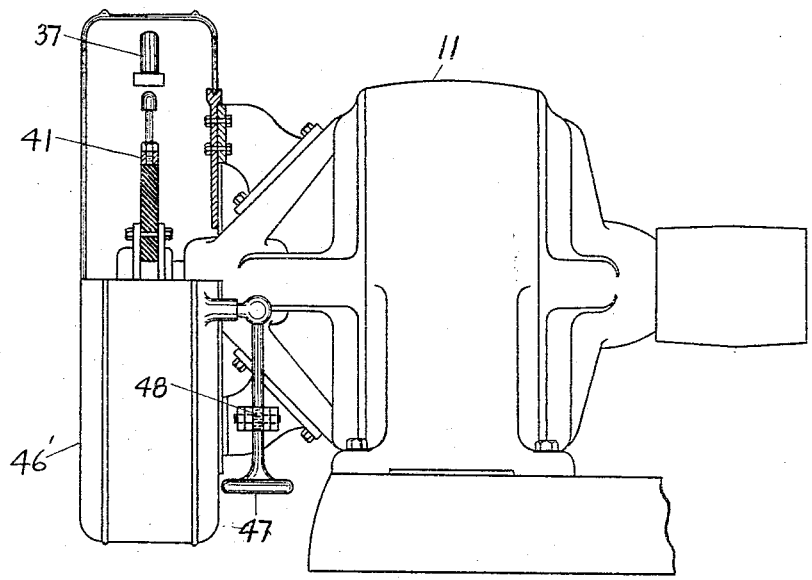

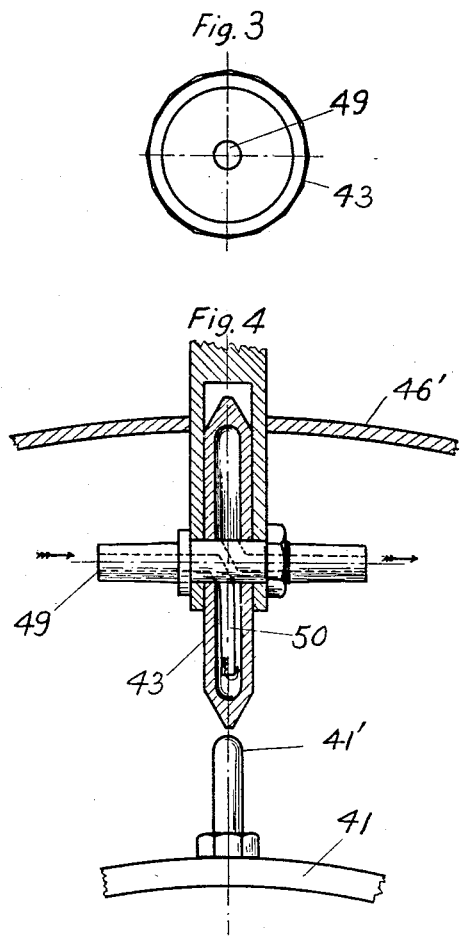

1,175,418.

Patented Mar. 14, 1916.
10 SHEETS—SHEET 4.

R. A. FESSENDEN.
WIRELESS TELEGRAPHY.
APPLICATION FILED FEB. 2, 1910.

1,175,418.

Patented Mar. 14, 1916.
10 SHEETS—SHEET 6.

Witnesses:

Reginald A. Fessenden,
Inventor,
By Attorney

R. A. FESSENDEN.
WIRELESS TELEGRAPHY.
APPLICATION FILED FEB. 2, 1910.

1,175,418.

Patented Mar. 14, 1916.
10 SHEETS—SHEET 7.

R. A. FESSENDEN.
WIRELESS TELEGRAPHY.
APPLICATION FILED FEB. 2, 1910.

1,175,418.

Patented Mar. 14, 1916.
10 SHEETS—SHEET 8.

Reginald A. Fessenden,
Inventor,

Witnesses:

By Attorney

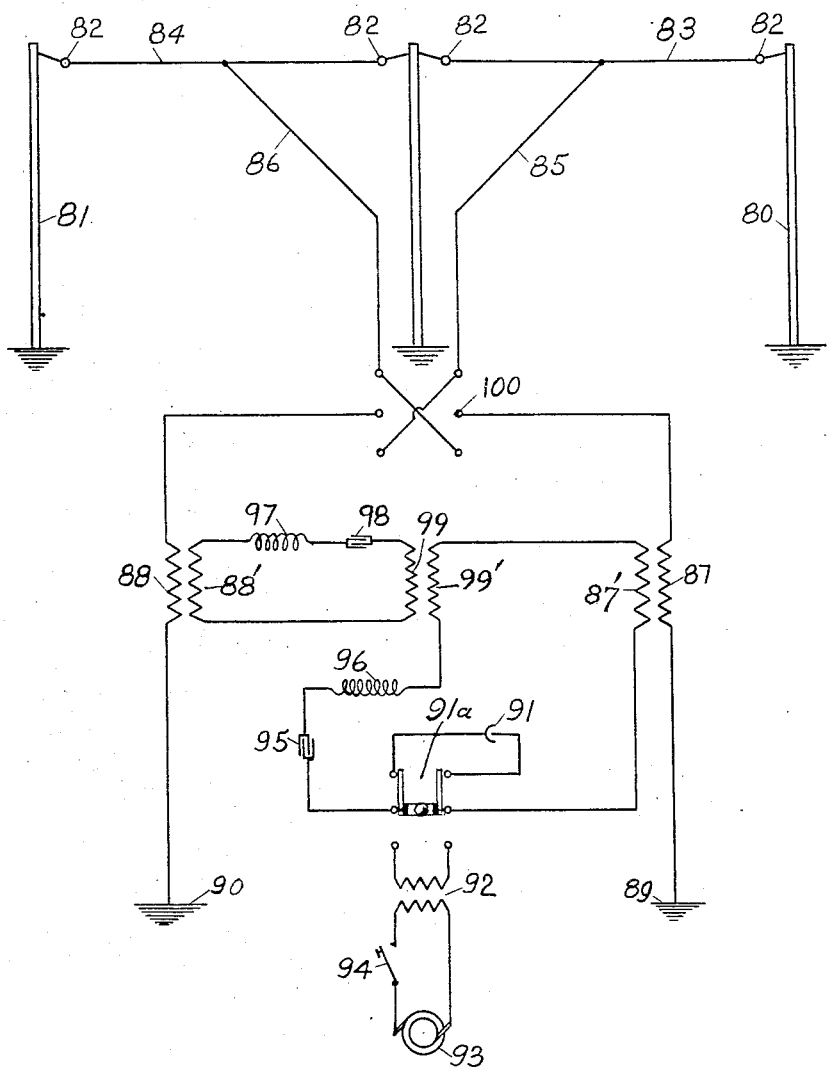

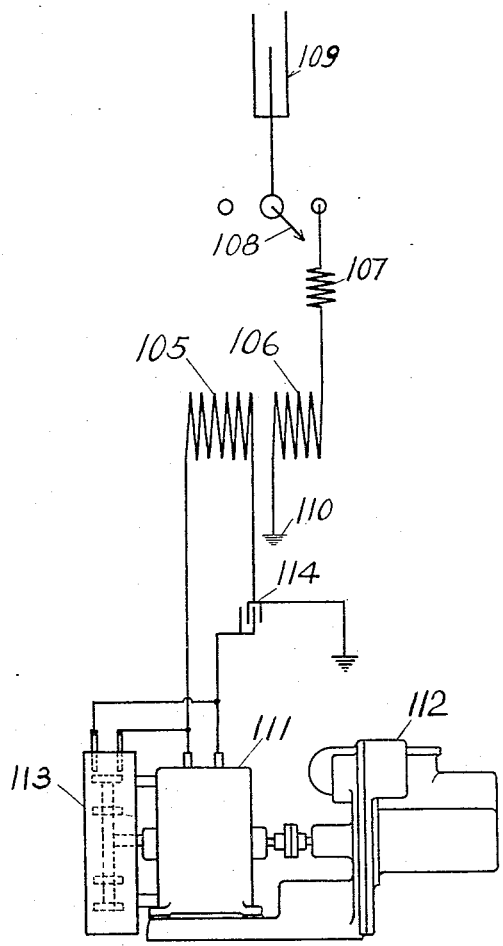

UNITED STATES PATENT OFFICE.

REGINALD A. FESSENDEN, OF BRANT ROCK, MASSACHUSETTS, ASSIGNOR, BY MESNE ASSIGNMENTS, TO SAMUEL M. KINTNER, OF PITTSBURGH, PENNSYLVANIA, AND HALSEY M. BARRETT, OF BLOOMFIELD, NEW JERSEY, RECEIVERS.

WIRELESS TELEGRAPHY.

1,175,418.  Specification of Letters Patent.  Patented Mar. 14, 1916.

Application filed February 2, 1910. Serial No. 541,606.

*To all whom it may concern:*

Be it known that I, REGINALD A. FESSENDEN, a citizen of the United States, residing at Brant Rock, in the county of Plymouth, State of Massachusetts, have invented certain new and useful Improvements in Wireless Telegraphy, of which the following is a specification.

My invention relates to signaling without wires, and more particularly to the more efficient production and receipt of wireless impulses, which is its primary object.

More particularly the apparatus here disclosed is designed for use in high powered stations where it is necessary to provide for high sparking frequencies, for switching large current without arcing and at high speed and generally to increase the power factor as by the use of inductances with small ohmic resistance and relief of the spark gap from brush discharges, etc.

Figure 5:
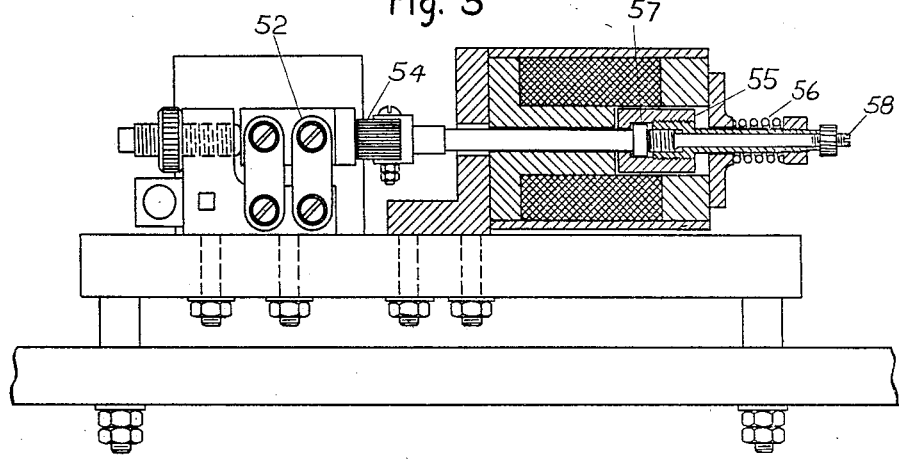
Figure 6:
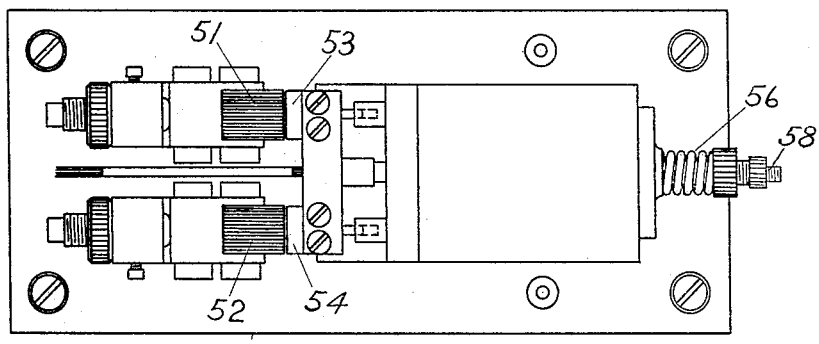
Figure 7:
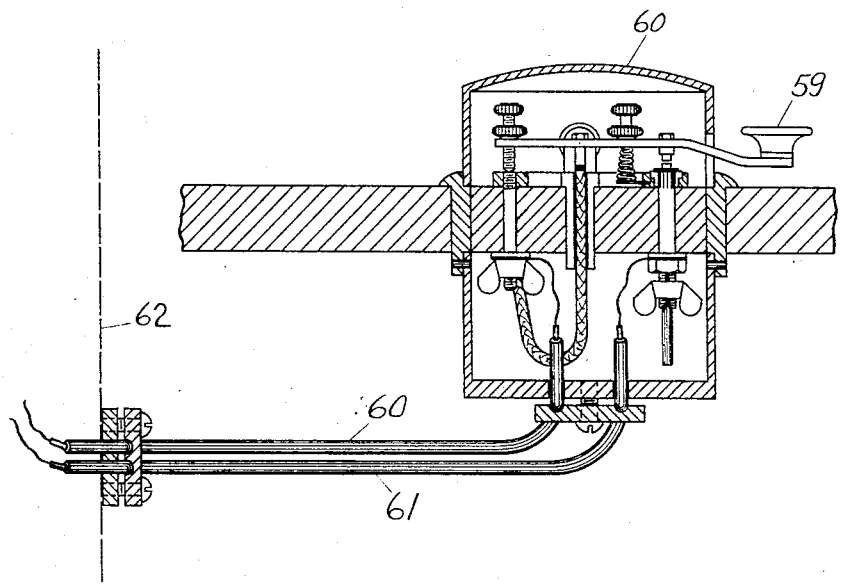
Figure 8:
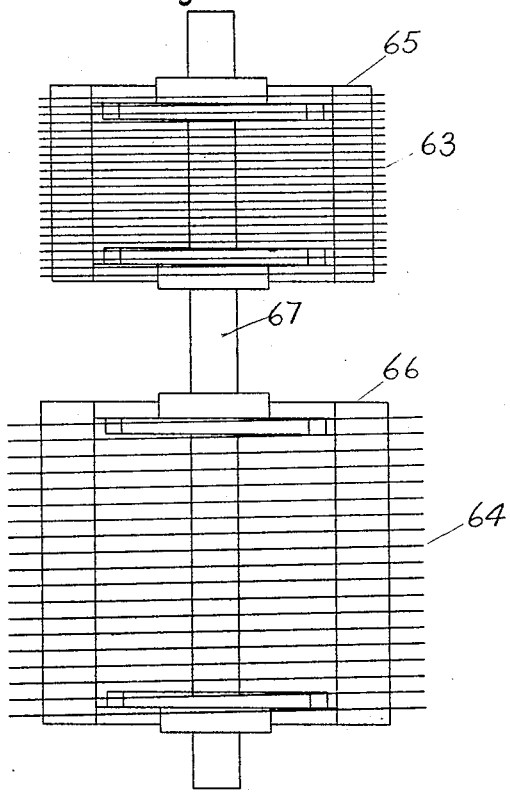
Figure 9:
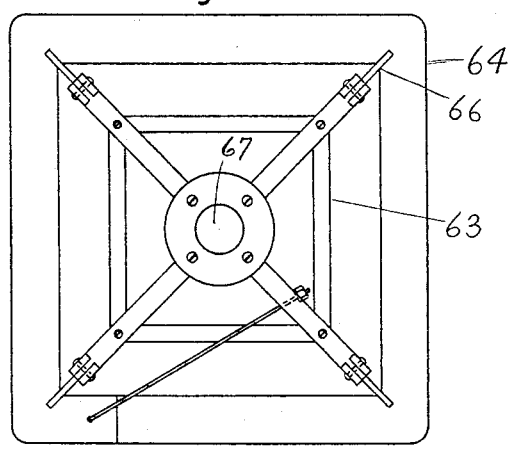
Figure 12:
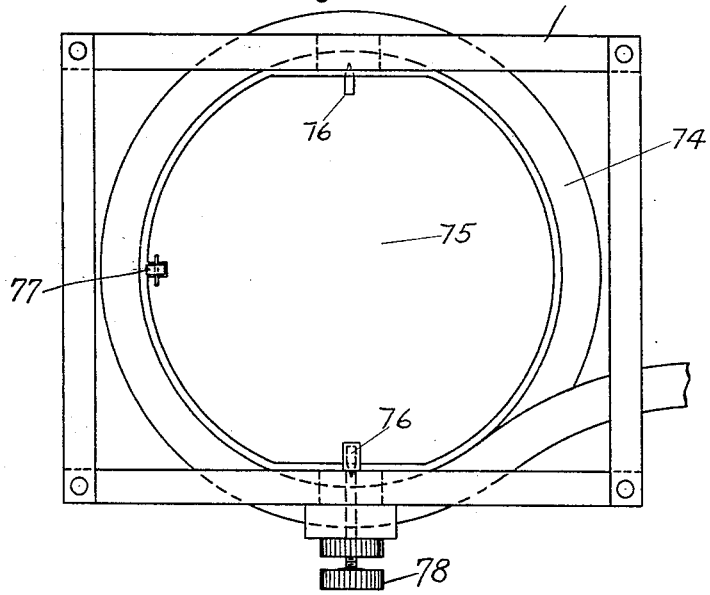
Figure 13:
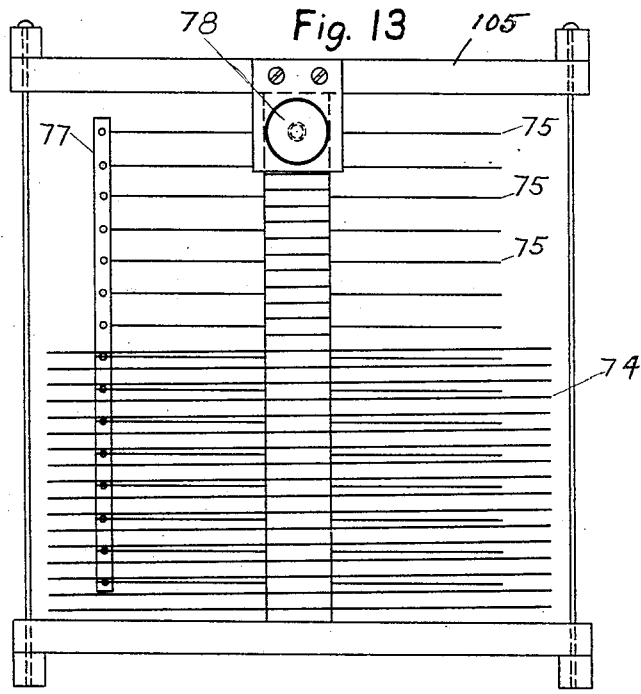

In the accompanying drawings forming a part of this specification, Figure 1 is a diagram showing an arrangement of circuits suitable for carrying out the invention and a diagrammatical illustration of a rotary spark gap for use therewith. Fig. 2 is a side elevation and partial section showing a generator and the spark gap. Figs. 3 and 4 show in detail respectively a side elevation and a section of the stationary electrode of the spark gap. Figs. 5 and 6 show respectively a side elevation and section, and a plan view of a relay for operating the circuit. Fig. 7 shows a cross-sectonal view of a key for operating the relay. Figs. 8 and 9 are respectively a side elevation and a plan view of a transformer for the electrical circuits, and Figs. 10 and 11 similar views of an inductance. Figs. 12 and 13 are respectively a plan and an elevation of another form of inductance. Fig. 14 shows diagrammatically an antenna and an arrangement of circuits for use with such antenna. Fig. 15 shows another arrangement of dynamo and circuits.

Figure 10:
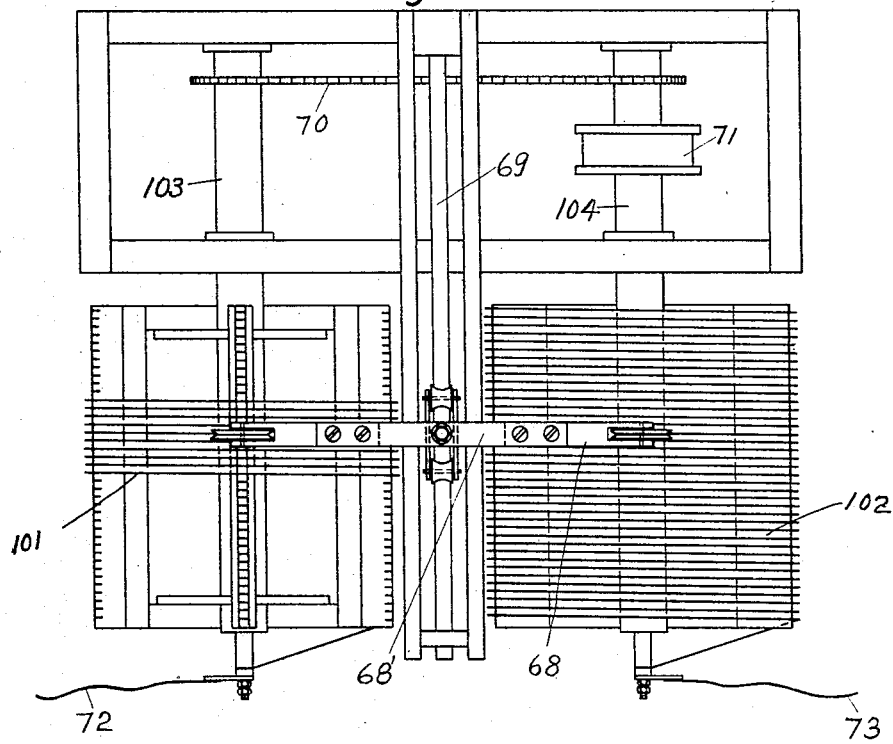
Figure 11:
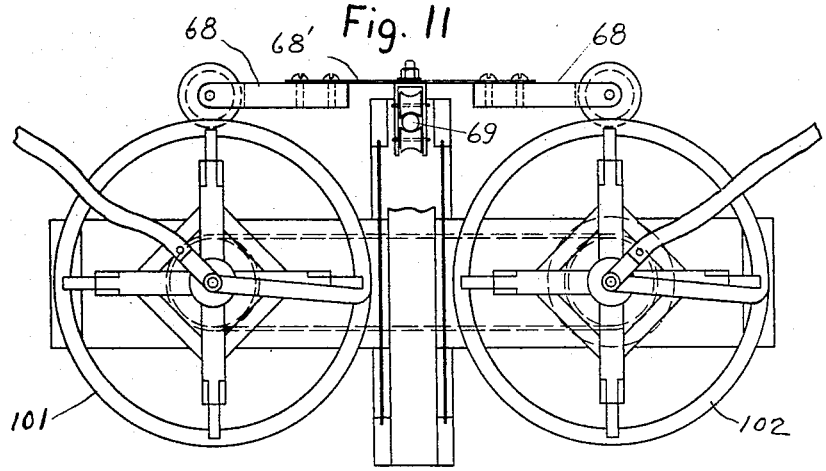

In Fig. 1, 11 represents a source of current, which may be a generator giving, say, a frequency of 500 cycles per second. One lead from this generator is connected to the electromagnet 12, thence to the primary 18 of a transformer whose secondary is 18′, thence to the primary 19 of the transformer whose secondary is 19′, thence through the coil 21 to the other electrode of generator 11. The current from the dynamo or other generator 11, may be controlled by the key 23, which on being depressed closes a circuit through a coil 22′ so arranged as to thus annul the inductance of the coil 22, and by doing so cause coil 21′ to annul the inductance of the coil 21. That is, when the key 23 is open the inductance in the coils 21 and 22 prevents any appreciable current from flowing through the line, but when this key is closed the inductance of the coils 21 and 22 is annulled as above described and the current flows freely through the circuit. A second method of controlling the current from the dynamo 11 is by means of key 17, which on being closed causes the battery 16 to excite the electromagnet 14 and draw back the contact piece of electromagnet 12, thus cutting out coil 18′. When this is the case no current can flow through the secondary 18′ of this transformer 18, 18′, and since the primary 18 possesses a large self-induction, practically no current flows from the dynamo 11, wherefore the transformer 19, 19′, is not excited. On the other hand, when the key 17 is opened, the magnet piece 14 is forced back into contact by a spring 15, short circuiting the secondary 18′ of the transformer 18, 18′, and thereby annulling the inductance of the primary 18 and causing the current to flow. Key 23 is preferably closed when signaling with key 17. When the key is so used, the signaling will be done in the reversed fashion, *i. e.* oscillations will be emitted for spaces and no radiation will be emitted for the dots and dashes. It will be noted that on account of the current from the dynamo 11 flowing through the electromagnet 12 the relay will not be opened on opening the key 17 until the current of the dynamo has fallen to practically zero. In this way the break is accomplished without sparking. When it is desired to use the key 23 instead of the key 17, the key 17 is left in the open position. Resistance coils 47, 48 (Fig. 1) are placed in circuit with the secondary 19′ of the transformer 19, 19′, and it is also connected to the condensers 20, the transformer 28, 28′, and the spark gap 46, the condensers 20 and primary of the transformer 28, forming a resonant circuit which preferably has the same frequency as that of the antenna being used. A protection gap 35 may be used as a discharge gap to protect the condensers. This may be cut out of action by throwing the switch 32 to the position shown in dotted lines 31. 30 and 36 are relays for closing the circuit between the secondary of the transformer 19, 19', and the electrodes 40 and 37 of the spark gap 46. When 30 and 36 are closed a discharge takes place at every half period between the stationary electrodes 37, 38, 39, 40 and a rotating disk 41, of spark gap 46; and when relays 30 and 36 are open the discharge takes place only once every period. Consequently by operating a key 25, which controls the current from a battery 24 through the relays 30 and 36, the discharge may be made to occur say 1000 times per second when the key 25 is open and 500 times per second when the key is closed. By this means the dots and dashes for signaling may be made to have a note of 1000 per second and the spaces a note of 500 per second. The tips of the electrodes of the spark gap, as shown at 43, may be made of water cooled disks, shown in detail in Figs. 3 and 4. For this purpose I use a cooling coil 44 and a circulating pump 45. The rotating spark gap may be inclosed in the casing 46' and the rotating disk 41 may be keyed on to the shaft 42 of the alternator 11. In Fig. 1 is shown also an antenna 26, grounded at 29, and operatively connected to the secondary 28 of the transformer 28, 28', shown in detail in Figs. 8 and 9. 27 represents an antenna inductance for varying the tune; it is shown in detail in Figs. 10 and 11, 12 and 13.

Fig. 2 shows a partial side elevation of the spark gap, in which 46' is the outside casing, 41 the rotating disk, 37 an electrode, 11 the generator, 47 a hand-wheel carrying a screw and nut 48 whereby the case 46' and electrode 37 may be rotated and shifted in position with reference to the dynamo 11 so as to cause the spark to be produced at the proper point of the potential curve.

In Figs. 3 and 4 showing the details of the stationary electrodes, 43 is a water cooled disk, made hollow as shown and milled so as to be generally round on its circumference but to have its surface consist of a number of plane faces. This is found to be advantageous for insuring the constancy of the spark. The disk 43 has a hollow axle 49 leading to the circulating pump 45 shown in Fig. 1, and 50 is a tube for projecting the water to the point of the disk 43 nearest the point where the spark takes place between it and the rotating disk 41.

In Figs. 5 and 6 showing the relays such as at 30 in Fig. 1, 51, 52 represent fixed jaws, and 53, 54 the movable jaws of the relay. 55 is a movable plunger for opening the relay and 56 an adjusting spring for closing it. 57 is a headed bolt attached to the movable jaws 53, 54, whereby, by adjusting the coöperating threaded bolt 58, the movable plunger 55 may be made to move a greater or less distance before retracting the movable jaws 53, 54, thereby making the break more or less rapid.

In Fig. 7 showing in detail a form of key 17 in Fig. 1, 60 is a metallic casing inclosing the key proper, 59, and acting as a shield to prevent any electrostatic disturbances produced by opening and closing of the key from affecting the receiver, and a wire netting 62 forms a screen over the whole device, lead covered cables 60, 61, connecting key 59 and leading outside the wire netting so that no operation of the key 59 will produce any electrical disturbances outside the screen.

In Figs. 8 and 9 showing the sending transformer 28, of Fig. 1, the primary and secondary are formed of strips of copper 63, 64, wound edgewise and supported on insulating frames 65, 66. The transformer may be made in round sections, or square sections as here shown. The primary 63 and secondary 64 are preferably made adjustable to and from each other by sliding on the axis 67. By constructing the transformer out of strips in the fashion shown a very great advantage is obtained over the use of cylindrical forms, as by this means the windings may be brought much closer to each other while still leaving the distance between turns the same, and since the inductance varies as the square of the number of turns per inch, the total length of wire may be very greatly reduced and the size of the inductance may be made very much smaller. Moreover, the mutual inductance between the primary and secondary may be made very much greater than in the case where the round conductors or tubes are used.

Figs. 10 and 11 show one form of the antennæ inductance 27 of Fig. 1. In this form I use two spirals of flat iron wound edgewise. A trolley bar 68 bridges across the two spirals 101, 102, and slides on a rod 69 when these spirals are revolved on their shafts 103, 104 which are connected together by sprocket chain 70 so that when the pulley 71 is rotated both spirals 101 and 102 are moved in the same direction and the bridging trolley bar 68 is caused to move backward or forward and thereby include a greater or less number of turns between the coil terminals 72, 73. This is very advantageous for tuning, and moreover the tuning can be accomplished without chance of the operator being injured, while the spark is passing.

Figs. 12 and 13 show another form of antenna inductance in which I use a single coil 74, inside of which are a number of disks 75, 75, 75. These disks are pivotally mounted on pins 76, 76, engaging frame 105, and attached to an insulating connecting bar 77, so that on rotating the handle 78 attached to one of the disks the inclination of all the disks to the surrounding coil 74 may be varied. When the disks 75 are in planes parallel to the planes of the turns of coil 74 the inductance in the coil 74 is largely annulled. When the handle 78 is turned so that the disks 75 are in a different plane to that of the turns of coil 74 the inductance of 74 is not annulled and is larger than before. In this way very exact tuning can be had.

In Fig. 14 showing an antenna and connections for same, 80 and 81 represent masts, 82, 82, 82, 82, insulators, and 83, 84 horizontal conductors such as shown in applicant's U. S. Patent No. 706,738, of August 12th, 1902. In these a long wave arriving from the side 83 for example will produce an effect in 83 of a different phase from that produced in 84, and a maximum effect will not be obtained. For this reason I lead the current from 83, 84 by means of conductors 85, 86, preferably attached to about the middle of the conductors 83, 84, and connect these leads 85, 86 operatively to the circuit containing the receiving or transmitting apparatus in such a way as to correct this difference of phase, and in such a way that this correction will be effected when the waves are arriving from one direction and preferably not when they are arriving from any other direction. I accomplish this by leading the conductors 85, 86 through the switch 100 and the transformers 87, 88 to ground at 89, 90. The transformer 87, 87' is connected preferably directly by means of the double throw switch 91ᵃ to the receiver 91 or to the sending transformer 92. 93 being a high frequency alternator and 94 a sending key, 95 a capacity and 96 an inductance. A transformer 88, 88' is connected to a second circuit containing the inductance 97 and capacity 98, and this circuit in turn is inductively connected by means of the transformer 99, 99' to the circuit containing the capacity 95, inductance 96 and secondary 87'. In this way, by adjusting the coupling, turns, and electrical constants of the transformer 87, the transformers 99 and 88 are able to cause the effects produced by the currents in the conductors 85 and 86 to coincide in phase. Thus by means of the reversing switch 100 I am able to arrange it so that the phase relation may be correct for waves arriving or being sent out from the side 83 of the antenna, or for waves arriving or being sent out from the side 84.

In Fig. 15 is shown another arrangement. Here 112 is a steam turbine; 111 is a 500 cycle dynamo, 113 a rotary spark gap, 114 a condenser, 105 a primary of a transformer, 106 the secondary of the transformer, grounded at 110, 107 a tuning inductance, 108 a switch and 109 an antenna. A relatively low voltage, preferably not exceeding 5,000 or 6,000 volts, is used on the rotary spark gap 113 and preferably no transformer is used, (though one may be used if desired) the dynamo 111 generating a voltage of 5,000 volts or 6,000 volts directly by its armature windings. This is found to give a higher efficiency not only by doing away with the losses in the transformer but also for other reasons which are not as yet fully known, but which have been experimentally demonstrated and which partly result in increased efficiency in the spark in doing away with the brush discharges, etc.

By means of adjusting the rotary spark gap herein disclosed and also by the form of electrodes disclosed I am enabled to obtain very high efficiency and to obtain a power factor as high as 96 or 98 per cent. from the generating apparatus, and this with large amounts of power. By means of the other devices shown herewith I am enabled to handle and utilize these large amounts of power in such a way as to obtain great efficiency of operation. For example, the flat strip inductances and transformer enable me to get the necessary amount of inductance for tuning with but a small fraction of the ohmic resistance necessary in the case of inductances or transformers formed of cylindrical conductors.

By mounting the rotary gap housing on the end of the generator itself I am enabled to avoid the possibility of angular displacement which is apt to occur when the housing and dynamo have separate foundations.

By forming a discharge gap 35 of balls having a very large diameter in proportion to the distance between them I am able to get a relief gap which breaks down at practically the same potential for high frequency discharges as for low and also one whose discharge voltage is practically independent of the time which the voltage is applied.

Having thus described my invention and illustrated its use, what I claim as new and desire to secure by Letters Patent, is the following:

1. In wireless telegraph apparatus, the combination of an oscillating circuit containing a spark gap with a plurality of stationary terminals, a generator, a movable member of the spark gap mounted on a rotating part of the generator, and means to change the spark frequency for signaling, by cutting out some of the stationary terminals of the spark gap.

2. In wireless telegraph apparatus, the combination with an oscillatory circuit containing a spark gap with several stationary terminals, of a generator, a rotating part of the generator forming one member of the spark gap and means to adjust the position of the stationary sparking electrode to vary the sparking point on the potential curve, and key operated means to change the spark frequency.

3. The combination with an oscillating circuit having a plurality of stationary terminals forming electrodes of a spark gap therein, of a series of rotating elements forming one electrode, said stationary terminals containing cooling means, a surrounding casing around the revolving element and the series of stationary terminals protruding therein, and electrically operated means to change the number of active terminals.

4. Apparatus for wireless telegraphy, comprising the combination of a generator circuit, inductance therefor, an oscillatory circuit including a rotary spark gap, an auxiliary protective discharge gap, a switch to alter the amount of said inductance, and said inductance being formed of flat strips to provide for low ohmic resistance.

5. In high powered wireless telegraph apparatus, the combination with an oscillating circuit containing a rotary spark gap, a condenser, inductance, a protective spark gap around the rotary gap and a secondary of a transformer, of a generator, a circuit containing the primary of said transformer, an extra inductance, and a key arranged to alter the effect of said inductance for signaling, substantially as described.

In testimony whereof I have hereunder signed my name in the presence of the two subscribed witnesses.

REGINALD A. FESSENDEN.

Witnesses:
JESSIE E. BENT,
FLORENCE M. LYON.

Copies of this patent may be obtained for five cents each, by addressing the "Commissioner of Patents, Washington, D. C."